US012776157B2

(12) United States Patent
Chen

(10) Patent No.: US 12,776,157 B2
(45) Date of Patent: Oct. 27, 2026

(54) ENGLISH WORD IMAGE RECOGNITION METHOD

(71) Applicant: ADVANCED VIEW INC., Taipei (TW)

(72) Inventor: Chung-Hsing Chen, Taipei (TW)

(73) Assignee: ADVANCED VIEW INC., Taipei (TW)

( * ) Notice: Subject to any disclaimer, the term of this patent is extended or adjusted under 35 U.S.C. 154(b) by 205 days.

(21) Appl. No.: 18/766,583

(22) Filed: Jul. 8, 2024

(65) Prior Publication Data

US 2025/0069427 A1 Feb. 27, 2025

(30) Foreign Application Priority Data

Aug. 25, 2023 (TW) ................................ 112132063

(51) Int. Cl.

| | |
|---|---|
| ***G06V 30/19*** | (2022.01) |
| ***G06V 10/82*** | (2022.01) |
| ***G06V 30/148*** | (2022.01) |
| ***G06V 30/162*** | (2022.01) |
| ***G06V 30/166*** | (2022.01) |
| ***G06V 30/18*** | (2022.01) |

(52) U.S. Cl.

CPC ........ *G06V 30/19127* (2022.01); *G06V 10/82* (2022.01); *G06V 30/158* (2022.01); *G06V 30/162* (2022.01); *G06V 30/166* (2022.01); *G06V 30/18076* (2022.01)

(58) Field of Classification Search

None

See application file for complete search history.

(56) References Cited

U.S. PATENT DOCUMENTS

2018/0018533 A1* 1/2018 Taranta, II .......... G06F 3/04883
2024/0420493 A1* 12/2024 Balaraman ............ G06F 40/279

* cited by examiner

*Primary Examiner* — Andrew H Lam

(74) *Attorney, Agent, or Firm* — Che-Yang Chen; Law Office of Michael Chen

(57) ABSTRACT

The invention provides an English word image recognition method, mainly loading a to-be-recognized image and performing a one-dimensional convolutional neural network operation and a fully connected operation processing to generate a feature map, outputting the feature map by a bidirectional long short-term memory (LSTM) network and performing a fully connected operation to generate a feature map, then performing a probability recognition and outputting a probabilistic string, and then recognizing the probabilistic string and outputting a word recognition result to solve the problem of producing a large amount of operation in the conventional two-dimensional recognition operation, thereby achieving efficacies of reducing costs of recognition equipment and enabling fast and accurate recognition.

9 Claims, 8 Drawing Sheets

P1

624

37

| | 0 | 1 | 2 | 3 | 4 | 5 | 6 | 7 | 8 | 9 | 10 | …… |
|---|---|---|---|---|---|---|---|---|---|---|---|---|
| 0 | 0.060 | 0.001 | 0.060 | 0.060 | 0.000 | 0.030 | 0.028 | 0.030 | 0.000 | 0.060 | 0.030 | |
| | | | | | | | | | | | | |
| 9 | 0.060 | 0.011 | 0.042 | 0.042 | 0.000 | 0.042 | 0.030 | 0.042 | 0.000 | 0.042 | 0.030 | |
| a | 0.990 | 0.990 | 0.012 | 0.005 | 0.001 | 0.031 | 0.001 | 0.001 | 0.000 | 0.001 | 0.031 | |
| ⋮ | | | | | | | | | | | | |
| e | 0.001 | 0.001 | 0.001 | 0.001 | 0.000 | 0.000 | 0.000 | 0.000 | 0.001 | 0.910 | 0.974 | |
| f | 0.005 | 0.002 | 0.000 | 0.000 | 0.000 | 0.002 | 0.002 | 0.002 | 0.002 | 0.031 | 0.031 | |
| ⋮ | | | | | | | | | | | | |
| l | 0.000 | 0.005 | 0.002 | 0.001 | 0.031 | 0.005 | 0.042 | 0.910 | 0.042 | 0.001 | 0.031 | |
| m | 0.000 | 0.042 | 0.000 | 0.000 | 0.005 | 0.042 | 0.031 | 0.005 | 0.042 | 0.012 | 0.031 | |
| n | 0.001 | 0.002 | 0.012 | 0.031 | 0.002 | 0.001 | 0.042 | 0.000 | 0.000 | 0.012 | 0.031 | |
| o | 0.042 | 0.042 | 0.042 | 0.031 | 0.000 | 0.000 | 0.012 | 0.031 | 0.005 | 0.001 | 0.012 | |
| p | 0.042 | 0.005 | 0.012 | 0.910 | 0.990 | 0.990 | 0.042 | 0.002 | 0.001 | 0.031 | 0.012 | |
| | | | | | | | | | | | | |
| z | 0.001 | 0.002 | 0.001 | 0.001 | 0.001 | 0.001 | 0.001 | 0.001 | 0.001 | 0.001 | 0.031 | |
| - | 0.000 | 0.002 | 0.910 | 0.000 | 0.042 | 0.042 | 0.910 | 0.031 | 0.997 | 0.001 | 0.031 | |

FIG. 8

ENGLISH WORD IMAGE RECOGNITION METHOD

BACKGROUND OF THE INVENTION

Field of Invention

The invention relates to an image recognition method, more particularly to an English word image recognition method capable of reducing costs of recognition equipment and enabling fast and accurate recognition.

Related Art

Currently, in word processing, English word recognition software needs to be used in the computer device to recognize English words after scanning. The current English word recognition method mainly recognizes each character one by one, and each word has multiple characters, so if the conventional recognition method has a character recognition error in a word, a word recognition error will occur. In order to improve this problem, some manufacturers have begun to use LSTM (long short-term memory) method to complete the training of arrangement relationship between the front and back letters. While some manufacturers use deep convolutional network and LSTM method to recognize an English word. Currently on the market, accurate recognition results can only be obtained by using graphics directly through deep network; however, the recognition method of deep network plus LSTM requires GPU to perform graphics operation. In a platform without GPU, it is basically difficult to achieve the task of real-time recognition. Therefore, in order to meet the requirement of GPU, the processor needs to be equipped with high-end hardware and computing system. However, in today's business environment, not all computer devices for general word processing are equipped with high-cost hardware and computing system. Under the condition of insufficient hardware and computing system, when the computer device recognizes English words, in addition to recognition errors, it is more likely to cause the computer device to slow down in operation or crash.

Therefore, the inventor of the invention and relevant manufacturers engaged in this industry are eager to research and make improvement to solve the above-mentioned problems and drawbacks in the prior art.

SUMMARY OF THE INVENTION

Therefore, in order to effectively solve the above-mentioned problems, a main object of the invention is to provide an English word image recognition method capable of reducing costs of recognition equipment and enabling fast and accurate recognition.

In order to achieve the above object, the invention provides an English word image recognition method at least comprising: loading a to-be-recognized image, a processing unit capturing at least one to-be-recognized English word in the to-be-recognized image, the processing unit generating a feature map at the first layer with an array of 1×628 according to a black dot ratio and a black dot density of the to-be-recognized English word; generating 6 feature maps at the second layer with an array of 1×626 by performing a one-dimensional convolution operation of convolutional neural network on the feature map at the first layer; generating 18 feature maps at the third layer with an array of 1×624 by performing a one-dimensional convolution operation of convolutional neural network on the feature maps at the second layer; forming a feature map at the fourth layer with an array of 18×624 by performing a fully connected operation processing of convolutional neural network on the feature maps at the third layer; forming a feature map at the fifth layer with an array of 64×624 by performing a fully connected operation processing of convolutional neural network on the feature map at the fourth layer; forming a feature map at the sixth layer with an array of 64×624 by outputting the fifth feature map through a bidirectional long short-term memory (LSTM) network and performing a fully connected operation processing; forming a feature map at the seventh layer with an array of 37×624 by outputting the feature map at the sixth layer through a bidirectional long short-term memory (LSTM) network and performing a fully connected operation processing; the processing unit performing a probability recognition according to the feature map at the seventh layer with an array of 37×624 and outputting a probabilistic string with a length of 624 characters; and the processing unit recognizing the probabilistic string according to a search setting and outputting a word recognition result.

The invention further discloses an English word image recognition method, wherein the processing unit retrieves the to-be-recognized image and defines a character picture frame for each character in the to-be-recognized image, and the processing unit calculates an average spacing distance of the character picture frame, and then retrieves the to-be-recognized English word from an average spacing distance.

The invention further discloses an English word image recognition method, wherein the processing unit defines a word picture frame for the to-be-recognized English word, and the processing unit scales the word picture frame into a scaled picture of 100×48 pixels.

The invention further discloses an English word image recognition method, wherein the processing unit vertically projects the scaled picture and generates a projected columnar distribution map with 100 black dot columns, and the processing unit then calculates a proportion value of each of the black dot columns from the projected columnar distribution map and generates a feature array at the first layer with an array of 1×100.

The invention further discloses an English word image recognition method, wherein the processing unit defines 33×16 feature picture grids averagely in the scaled picture, and calculates a black dot density of each of the feature picture grids generate a feature array at the second layer with an array of 1×528, the processing unit combines the feature array at the first layer with the feature array at the second layer to generate the feature map at the first layer.

The invention further discloses an English word image recognition method, wherein the processing unit uses a core with a random value and an array of 1×3 to perform 6 one-dimensional convolution operations of convolutional neural network to generate the 6 feature maps at the second layer with an array of 1×626.

The invention further discloses an English word image recognition method, wherein the processing unit uses a core with a random value and an array of 1×3 to perform 18 one-dimensional convolution operations of convolutional neural network to generate the 18 feature maps at the third layer with an array of 1×626.

The invention further discloses an English word image recognition method, wherein the processing unit uses a bidirectional long short-term memory (LSTM) network to output the feature map at the fifth layer into a feature map with an array of 128×624, and performs a fully connected operation processing to form the feature map at the sixth layer with an array of 64×624, and the processing unit uses a bidirectional long short-term memory (LSTM) network to output the feature map at the sixth layer map into a feature map with an array of 128×624, and performs a fully connected operation processing to form the feature map at the seventh layer with an array of 37×624.

The invention further discloses an English word image recognition method, wherein the search setting comprises a blank character setting and a repeated character setting, and the processing unit recognizes the probabilistic string and removes the blank character setting and the repeated character setting to output the word recognition result.

BRIEF DESCRIPTION OF THE DRAWINGS

FIG. 8 is a schematic diagram of a probability vector table of the invention.

DETAILED DESCRIPTION OF THE INVENTION

The above object of the invention, as well as its structural and functional features, will be described in accordance with the preferred embodiments of the accompanying drawings.

In the following, for the formation and technical content related to an English word image recognition method of the invention, various applicable examples are exemplified and explained in detail with reference to the accompanying drawings; however, the invention is of course not limited to the enumerated embodiments, drawings, or detailed descriptions.

Furthermore, those who are familiar with this technology should also understand that the enumerated embodiments and accompanying drawings are only for reference and explanation, and are not used to limit the invention; other modifications or alterations that can be easily implemented according to the detailed descriptions of the invention are also deemed to be within the scope without departing from the spirit or intention thereof as defined by the appended claims and their legal equivalents.

And, the directional terms mentioned in the following embodiments, for example: “above”, “below”, “left”, “right”, “front”, “rear”, etc., are only directions referring in the accompanying drawings. Therefore, the directional terms are used to illustrate rather than limit the invention. In addition, in the following embodiments, the same or similar elements will be labeled with the same or similar numbers.

Figure 1:
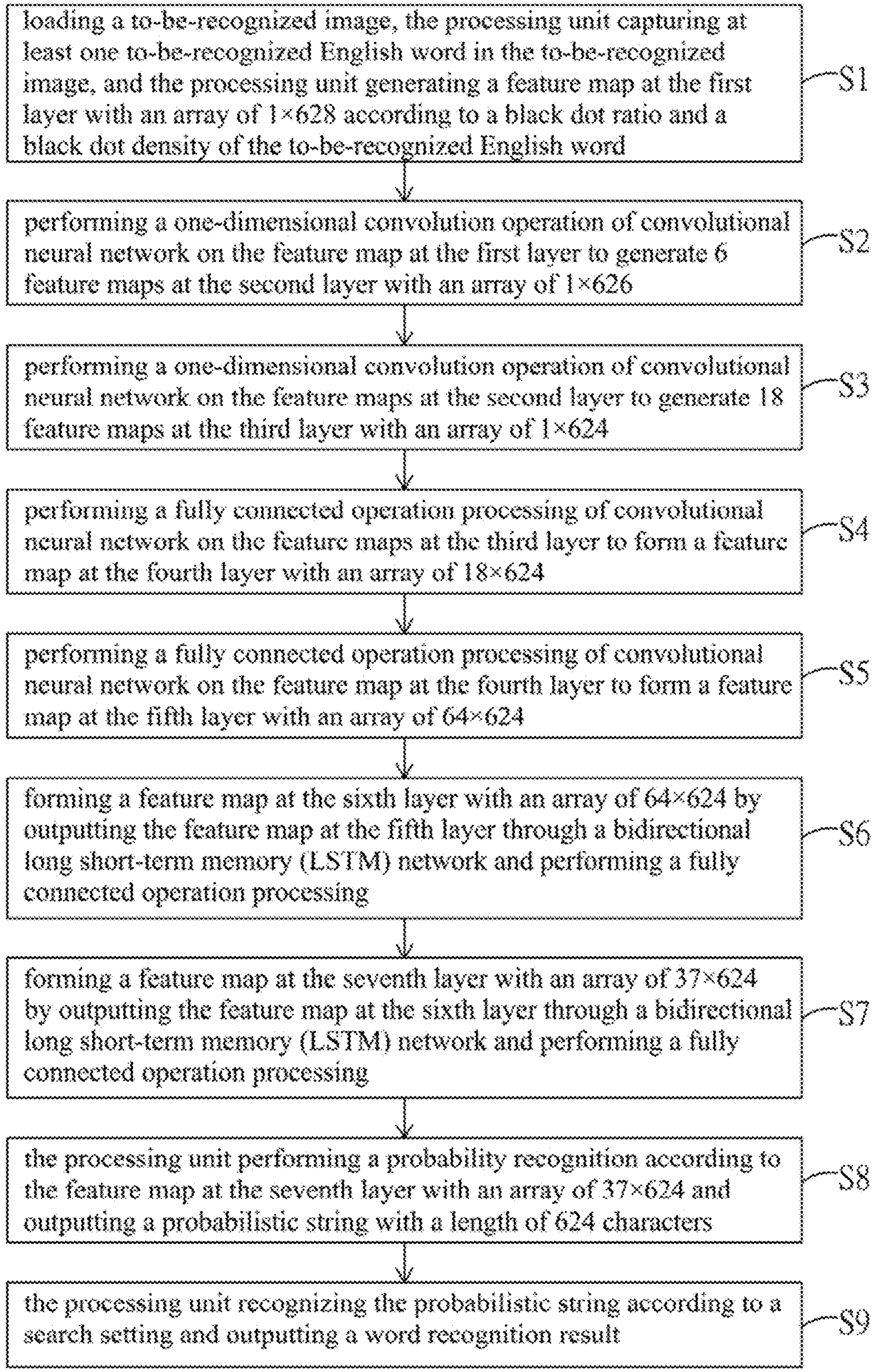
FIG. 1 is a flow chart of an English word image recognition method of the invention.
Figure 2:
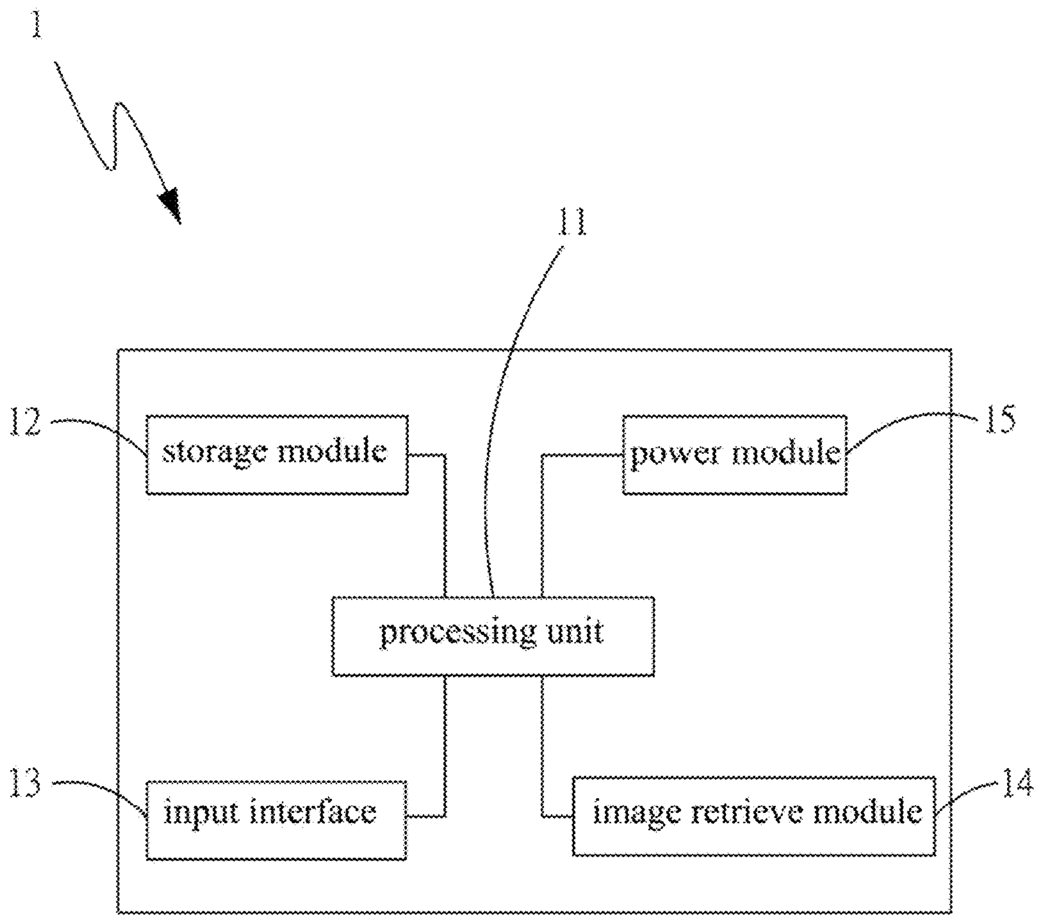
FIG. 2 is a schematic diagram of a hardware architecture of an electronic device of the invention.

Please refer to FIG. 1 and FIG. 2 at the same time respectively for a flow chart of an English word image recognition method of the invention; and a schematic diagram of a hardware architecture of an electronic device of the invention. Wherein an English word image recognition method of the invention is mainly applied to electronic devices with computing capabilities, such as desktop computer, notebook, mobile phone or tablet. An electronic device 1 of the invention comprises a processing unit 11, a storage module 12, an input interface 13, an image retrieve module 14 and a power module 15, wherein the processing unit 11 is electrically connected to the storage module. 12, the input interface 13, the image retrieve module 14 and the power module 15. Wherein the storage module 12 is used to store digital images, the input interface 13 is used to control image retrieve and image retrieve operation, the image retrieve module 14 is used to shoot digital images or scan digital images or use image reading to retrieve images, and the power module 15 is used to provide an operating electric power for the processing unit 11, the storage module 12, the input interface 13 and the image retrieve module 14, and the English word image recognition method is as follows.

Step S1: loading a to-be-recognized image, the processing unit capturing at least one to-be-recognized English word in the to-be-recognized image, and the processing unit generating a feature map F1 at the first layer with an array of 1×628 according to a black dot ratio and a black dot density of the to-be-recognized English word; wherein before performing English word image recognition, the to-be-recognized image is obtained through the image retrieve module 14, wherein the image retrieve module 14 can scan a picture with a scanner or obtain an image to be recognized by using image reading, and then the processing unit 11 converts the image into a black and white picture using an average bright and dark jump point binarization method.

Figure 3:
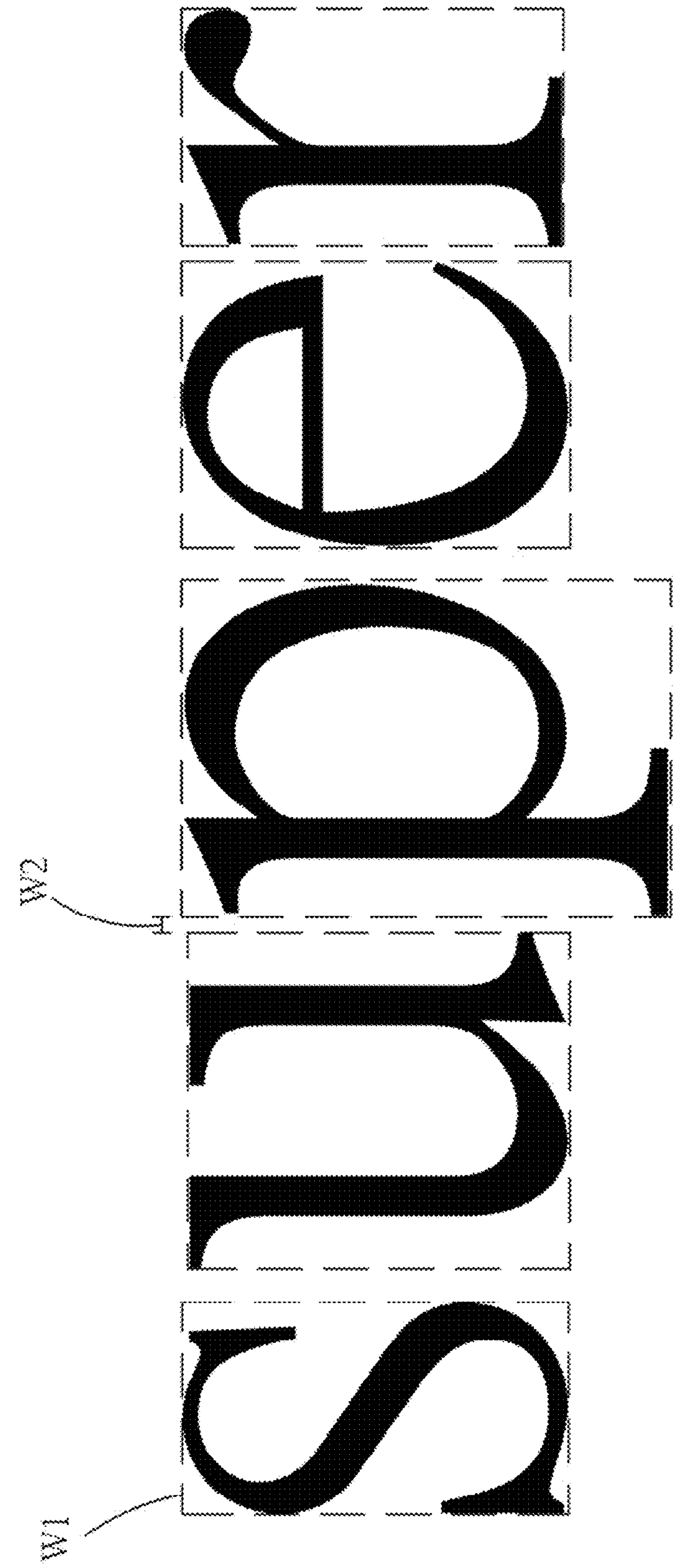
FIG. 3 is a first schematic flow diagram of the English word image recognition method of the invention.

As shown in FIG. 3, wherein after the processing unit 11 converts the to-be-recognized image into a black and white picture, the processing unit 11 uses a connection method to mark English characters. The connection principle is based on aggregation of black connected dots to form rectangular coordinates, that is, the processing unit 11 defines a character picture frame W1 for a periphery of each character in each line of the to-be-recognized image sequentially from top to bottom, and the character picture frame W1 is created by expanding from the upper left to the lower right direction of each letter so that the character picture frame W1 is defined on a periphery of the character, after the character picture frame W1 is created, characters and blanks on an image to be recognized are found through the marking procedure. Wherein there is a character spacing W2 between each of the character picture frames W1, and the processing unit 11 then adds up distances of all the character spacings W2 in each line and divides it by a total number of the character spacings W2 in each line, so the processing unit 11 obtains an average spacing distance of each line, and then compares a distance of each of the character spacings W2 of each line with an average spacing distance of each line. If a distance of the character spacing W2 of each line is greater than an average spacing distance of each line, it means that the character spacing W2 is a blank between each of the to-be-recognized English words. On the contrary, if a distance of the character spacing W2 of each line is less than an average spacing distance of each line, it means that the character spacing W2 is a blank between every two characters of the to-be-recognized English word. Thereby, the processing unit 11 can use the marking procedure to find characters and blanks on an image to be recognized and obtain the to-be-recognized English word in the to-be-recognized image. In this embodiment, the English word “super” is used as an implementation mode.

Figure 4:
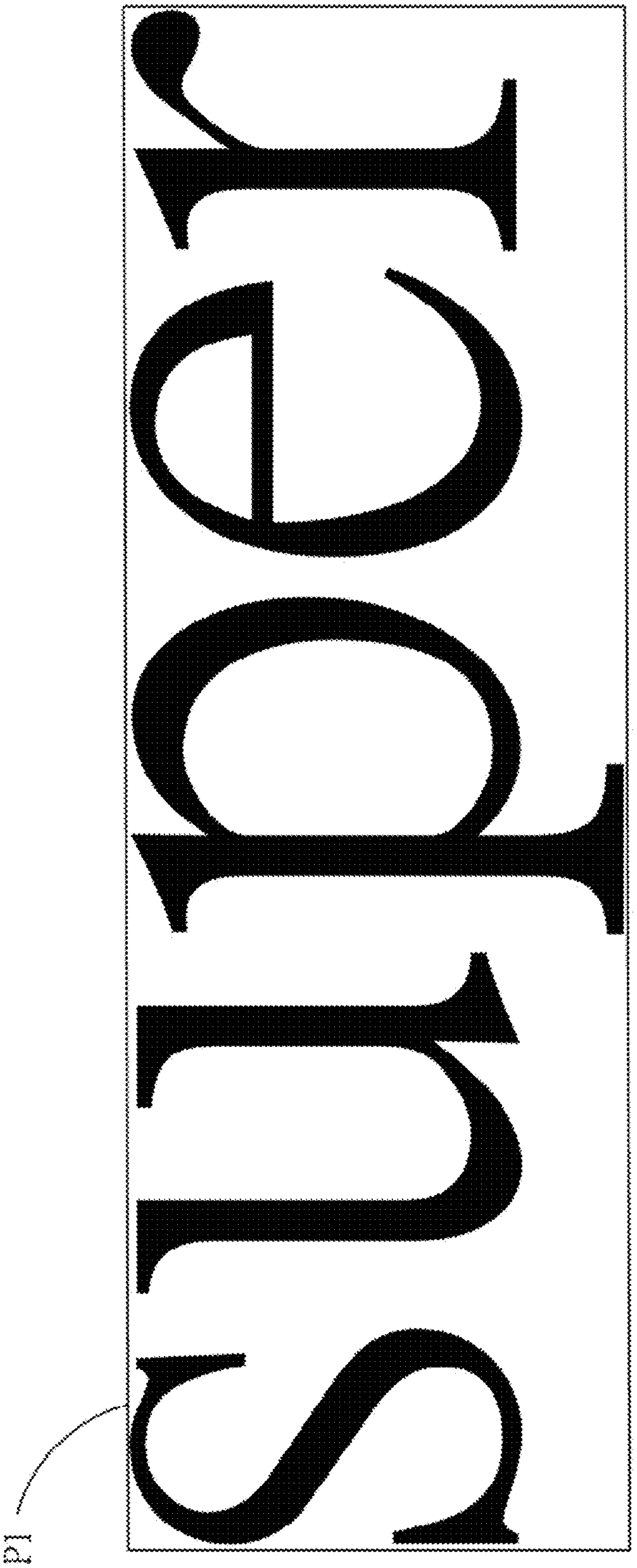
FIG. 4 is a second schematic flow diagram of the English word image recognition method of the invention.

As shown in FIG. 4, wherein after the processing unit 11 retrieves the to-be-recognized English word, the processing unit 11 first defines the to-be-recognized English word as a word picture frame, and the processing unit 11 deforms and scales the word picture frame into a scaled picture of 100 (picture width)×48 (picture height) pixels. Wherein deformation scaling is used because lengths of the to-be-recognized English words are different, so the processing unit 11 uses the deformation scaling to unify it into the scaled picture P1 of 100×48 pixels.

Figure 5:
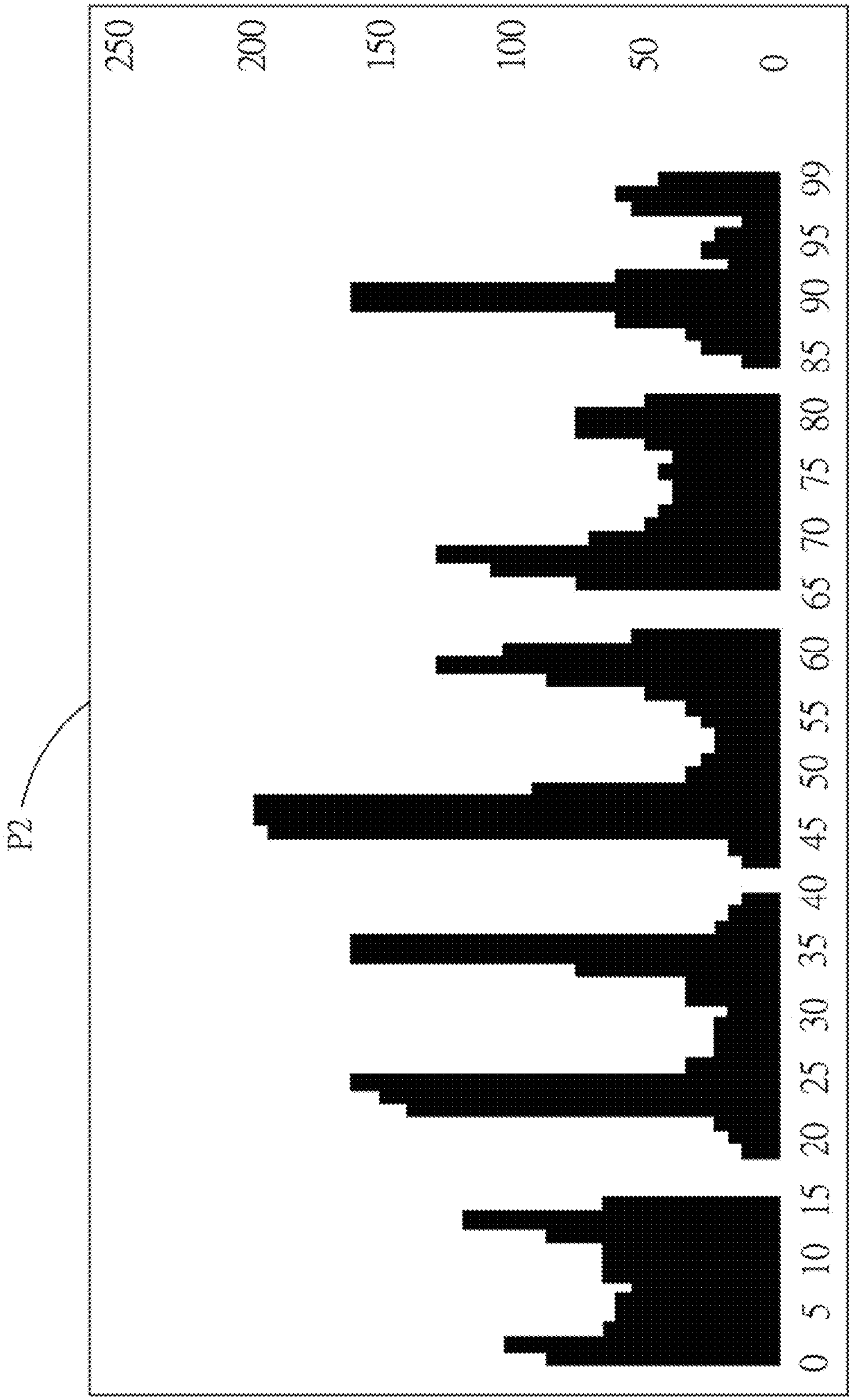
FIG. 5 is a third schematic flow diagram of the English word image recognition method of the invention.

As shown in FIG. 5, wherein after the processing unit 11 generates the scaled picture P1 of 100×48 pixels, the processing unit 11 vertically projects the scaled picture P1, so that the scaled picture P1 is converted into a projected columnar distribution map P2 with 100 black dot columns, wherein an X-axis of the projected columnar distribution map P2 is a width of the scaled picture P1, and a Y-axis of the projected columnar distribution map P2 is a black dot projection amount of each of the black dot columns, and the processing unit 11 calculates a projection feature of the scaled picture P1 through the projected columnar distribution map P2, and a formula for converting into a feature is:

$$S = \sum_{i=0}^{w-1} v[i],$$

wherein S is a sum of a number of all black dots, wherein w is a picture width, wherein v[i] is a number of projected black dots, wherein i=0 to w−1; V[i]=v[i]/S, wherein V[i] is a proportion value of each of the black dot columns, so through the above relational expression, the processing unit 11 can obtain a proportional value of each of the black dot columns, and the processing unit 11 converts a proportional value of each of the black dot columns into a feature array at the first layer with an array of 1×100.

Figure 6:
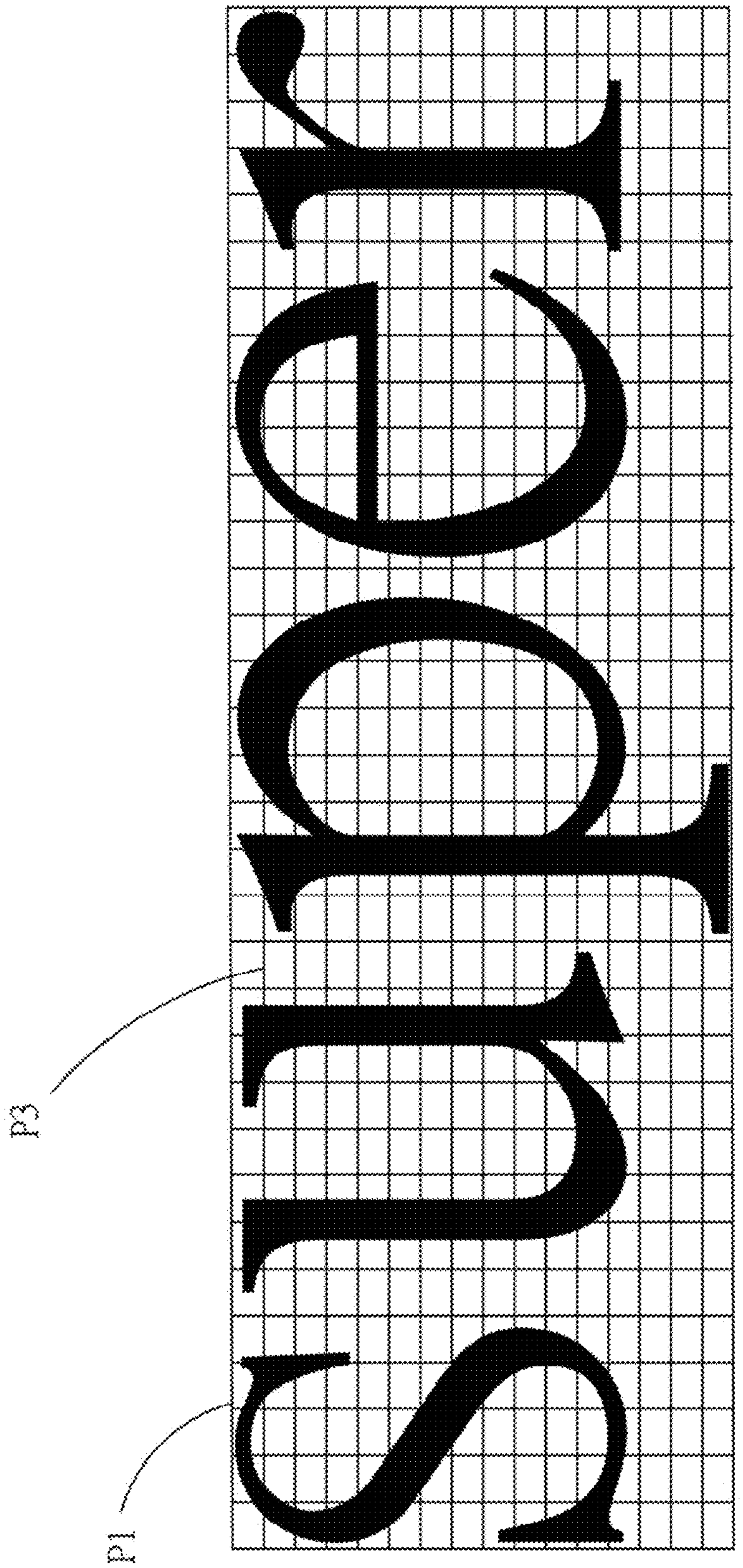
FIG. 6 is a fourth schematic flow diagram of the English word image recognition method of the invention.
Figure 7:
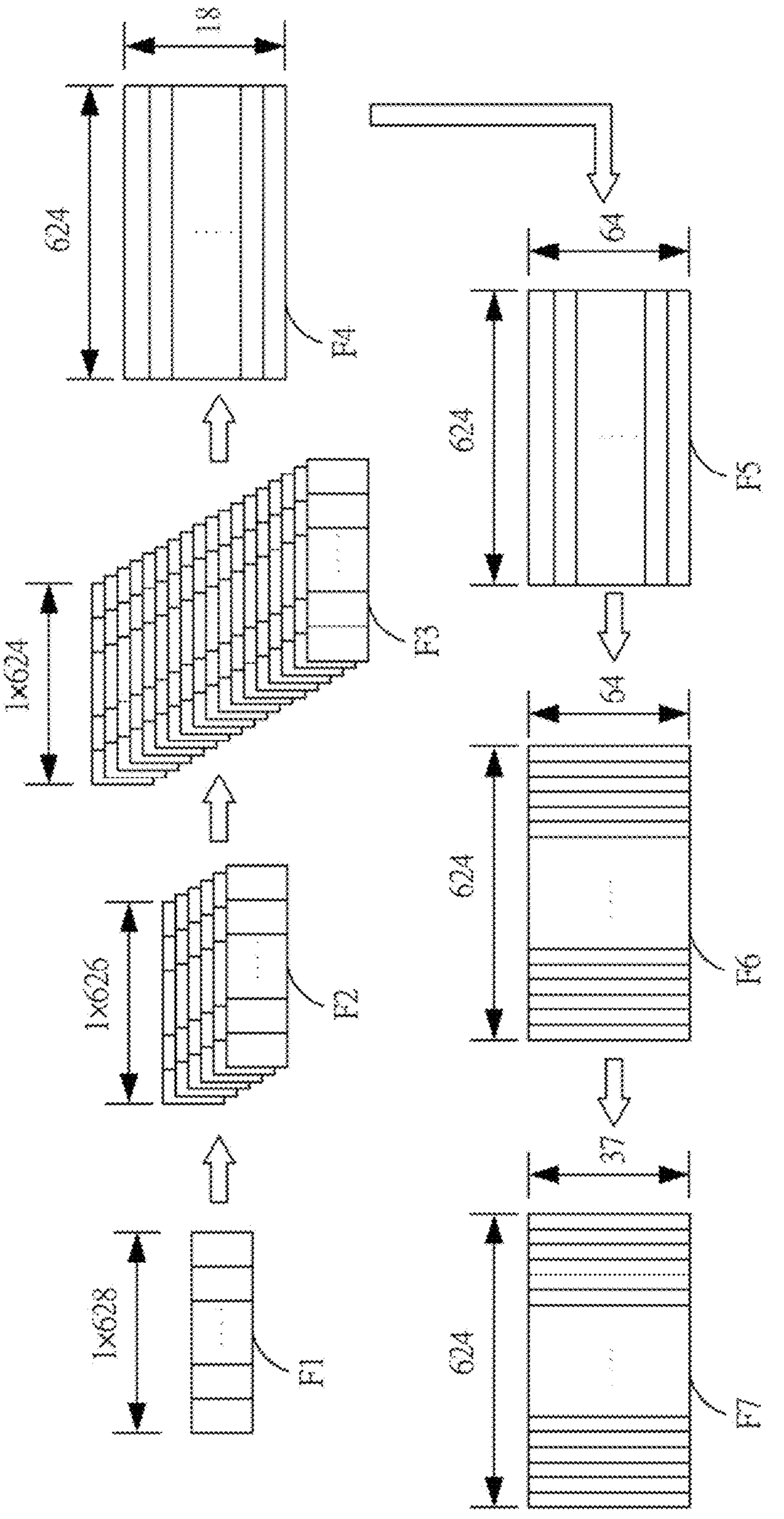
FIG. 7 is a fifth schematic flow diagram of the English word image recognition method of the invention.

As shown in FIG. 6 and FIG. 7, the processing unit 11 then defines the scaled picture P1 with 33×16 feature picture grids averagely, the processing unit 11 calculates a number of black dots and a total number of dots (number of black dots+number of white dots) of each of the feature picture grids, and the processing unit 11 then calculates a black dot density d [x,y] of each of the feature picture grids from a number of black dots and a total number of dots, and an array sequence is from left to right, and from top to bottom. The processing unit 11 then calculates a black dot density of each of the feature picture grids to generate a feature array at the second layer with an array of 1×528, and then the processing unit 11 combines the feature array at the first layer with the feature array at the second layer to generate the feature map F1 at the first layer with an array of 1×628.

Step S2: performing a one-dimensional convolution operation of convolutional neural network on the feature map F1 at the first layer to generate 6 feature maps F2 at the second layer with an array of 1×626; wherein after the feature map F1 at the first layer with an array of 1×628 is generated, the processing unit 11 reads the feature map F1 at the first layer with an array of 1×628, and the processing unit 11 performs a one-dimensional convolution operation of convolutional neural network (CNN) on the feature map F1 at the first layer with an array of 1×628, and the processing unit 11 performs 6 one-dimensional convolution operations with a core with a random value and an array of 1×3, after the operations are completed, the 6 feature maps F2 at the second layer with an array of 1×626 are generated.

Step S3: performing a one-dimensional convolution operation of convolutional neural network on the feature maps F2 at the second layer to generate 18 feature maps F3 at the third layer with an array of 1×624; wherein after the 6 feature maps F2 at the second layer with an array of 1×626 are generated, the processing unit 11 reads the 6 feature maps F2 at the second layer with an array of 1×626, and the processing unit 11 performs a one-dimensional convolution operation of convolutional neural network (CNN) on the 6 feature maps F2 at the second layer with an array of 1×626, and the processing unit 11 performs 18 one-dimensional convolution operations with a core with a random value and an array of 1×3, after the operations are completed, the 18 feature maps F3 at the third layer with an array of 1×624 are generated.

Step S4: performing a fully connected operation processing of convolutional neural network on the feature maps F3 at the third layer to form a feature map F4 at the fourth layer with an array of 18×624; wherein after the 18 feature maps F3 at the third layer with an array of 1×624 are generated, the processing unit 11 performs a fully connected processing (fully connected layer) on the 18 feature maps F3 at the third layer with an array of 1×624, so the processing unit 11 generates the feature map F4 at the fourth layer with an array of 18×624.

Step S5: performing a fully connected operation processing of convolutional neural network on the feature map F4 at the fourth layer to form a feature map F5 at the fifth layer with an array of 64×624; wherein after the feature map F4 at the fourth layer with an array of 18×624 is generated, the processing unit 11 performs a second fully connected processing on the feature map F4 at the fourth layer with an array of 18×624, so the processing unit 11 generates the feature map F5 at the fifth layer with an array of 64×624.

Step S6: forming a feature map F6 at the sixth layer with an array of 64×624 by outputting the feature map F5 at the fifth layer through a bidirectional long short-term memory (LSTM) network and performing a fully connected operation processing; wherein after the feature map F5 at the fifth layer with an array of 64×624 is generated, the processing unit 11 uses a bidirectional long short-term memory (LSTM) network to output the feature map F5 at the fifth layer into a feature map with an array of 128×624, and the processing unit 11 performs a fully connected operation processing on the feature map with an array of 128×624 according to a parameter setting, and generates the feature map F6 at the sixth layer with an array of 64×624.

Step S7: forming a feature map F7 at the seventh layer with an array of 37×624 by outputting the feature map F6 at the sixth layer through a bidirectional long short-term memory (LSTM) network and performing a fully connected operation processing; wherein after the feature map F6 at the sixth layer with an array of 64×624 is generated, the processing unit 11 uses a bidirectional long short-term memory (LSTM) network to output the feature map F6 at the sixth layer into a feature map with an array of 128×624, and the processing unit 11 performs a fully connected operation processing on the feature map with an array of 128×624 according to a parameter setting, and generates the feature map F7 at the seventh layer with an array of 37×624.

Step S8: the processing unit 11 performing a probability recognition according to the feature map F7 at the seventh layer with an array of 37×624 and outputting a probabilistic string with a length of 624 characters; wherein after the feature map F7 at the seventh layer with an array of 37×624 is generated, the processing unit 11 uses a greedy algorithm to define 37 categories, and arranges them in a sequence from 0~623 on the feature map F7 at the seventh layer, as shown in FIG. 8, it is a schematic diagram of greedy algorithm, a definition method is that categories 0-9 represent numbers 0~9, categories 10-35 represent lowercase letters a~z, and category 36 is blank (_), but a way the categories are defined is not limited thereto, after the categories are defined, the processing unit 11 performs a greedy algorithm on values in the feature map F7 at the seventh layer, and then the processing unit 11 performs probability recognition to output a probabilistic string, as shown in FIG. 8, the processing unit 11 recognizes and retrieves a probability of each coordinate position, which mainly recognizes a position where a probability is close to 1, such as a probability of a in position (0) is 0.990, a probability of e is 0.001, a probability of f is 0.005, a probability of 1 is 0.000, a probability of m is 0.000, and a probability of n is 0.001, so the processing unit 11 retrieves the a; or a probability of a in position (1) is 0.990, a probability of e is 0.001, a probability of f is 0.002, a probability of 1 is 0.005, a probability of m is 0.042, and a probability of n is 0.002, so the processing unit 11 retrieves the a; or a probability of a in position (2) is 0.012, a probability of e is 0.001, a probability of f is 0.000, a probability of 1 is 0.002, a probability of m is 0.000, a probability of n is 0.012, and a probability of blank (_) is 0.910, so the processing unit 11 retrieves the blank (_), and so on, the processing unit 11 retrieves probabilities of 624 positions through a greedy algorithm, and outputs a probabilistic string with a length of 624 characters. In this embodiment, the processing unit 11 is implemented by retrieving aa_ppp_l_ee, which means that the processing unit 11 generates a probabilistic string of aa_ppp_l_ee.

Step S9: the processing unit recognizing the probabilistic string according to a search setting and outputting a word recognition result; wherein after the processing unit 11 generates the probabilistic string, the processing unit 11 recognizes the probabilistic string according to the search setting, in this embodiment, the search setting comprises a blank character setting and a repeated character setting, wherein the blank character setting is blank (_), and the repeated character setting is that the processing unit 11 recognizes the probabilistic string and retrieves characters and a number of repeated words. In this embodiment, a maximum times of a character being repeated is 2 times, so the processing unit 2 defines 2 times as a removal variable, and then scans the probabilistic string again, and a character that appears for the first time is defined as a comparison character. In this embodiment, the processing unit 11 recognizes a character that appears for the first time is "a", the processing unit 11 outputs the "a" and defines the "a" as a comparison character, and then scans the probabilistic string again, and the processing unit 11 recognizes a second character is "a", that is, it is the same as the comparison character and conforms to the removal variable, so the processing unit 11 removes the second character "a".

Then the probabilistic string is rescanned, and the processing unit 11 recognizes a third character is "_", and removes it according to the blank character setting. The processing unit 11 rescans the probabilistic string, and the processing unit 11 recognizes a fourth character is "p", then outputs "p" and defines a comparison character, and scans the probabilistic string again. The processing unit 11 recognizes a fifth character is "p", that is, it is the same as the comparison character and conforms to the removal variable, so the processing unit 11 removes the fifth character "p". The processing unit 11 then rescans the probabilistic string, and the processing unit 11 recognizes the sixth characters is "p", and the sixth character "p" does not meet the removal variable, so the sixth character "p" is retained and output.

Then the probabilistic string is rescanned, and the processing unit 11 recognizes a seventh character is "_", and removes it according to the blank character setting. The processing unit 11 then rescans the probabilistic string, and the processing unit 11 recognizes an eighth character is "1", then outputs "l" and defines a comparison character, and scans the probabilistic string again. The processing unit 11 recognizes a ninth character is "_", it is removed according to the blank character setting, and the processing unit 11 rescans the probabilistic string. The processing unit 11 recognizes that a tenth character is "e", and outputs "e" and defines a comparison character, and scans the probabilistic string again. The processing unit 11 recognizes an eleventh character is "e", which is the same as the comparison character and conforms to the removal variable, so the processing unit 11 removes the eleventh character "e", and the processing unit 11 outputs a word recognition result containing "apple".

The processing unit 11 performs the aforementioned procedure for each line of the to-be-recognized image, and a sequence in which the processing unit 11 recognizes and outputs the to-be-recognized image is based on coordinates from left to right and from top to bottom, so that all the scaled pictures P1 in the to-be-recognized image produce the word recognition results, thereby the English word image recognition method of the invention can solve the problem of producing a large amount of operation in the conventional two-dimensional recognition operation, thereby achieving efficacies of reducing costs of recognition equipment and enabling fast and accurate recognition by using one-dimensional recognition operation.

The invention has been described in detail above, but the above description is only a preferred embodiment of the invention, and should not limit a scope implemented by the invention, that is, all equivalent changes and modifications made according to the applied scope of the invention should still fall within the scope covered by the appended claims of the invention.

What is claimed is:

1. An English word image recognition method, applied to an electronic device with computing capabilities, the electronic device comprising a processing unit, the English word image recognition method at least comprising:

loading a to-be-recognized image, the processing unit capturing at least one to-be-recognized English word in the to-be-recognized image, the processing unit defining a word picture frame for the to-be-recognized English word and scaling the word picture frame into a scaled picture, the processing unit vertically projecting the scaled picture and generating a projected columnar distribution map, the processing unit calculating a projection feature of the scaled picture through the projected columnar distribution map, and a formula for converting into feature being:

$$S=\sum_{i=0}^{w-1} v[i],$$

wherein S is a sum of a number of all black dots and v[i] is a number of i=0 projected black dots, and wherein i=0 to w−1; V[i]=v[i]/S, and V[i] is a proportion value of each of the black dot columns, the processing unit defining 33×16 feature picture grids averagely in the scaled picture and calculating a black dot density of each of the feature picture grids, then the processing unit generating a feature map at the first layer with an array of 1×628 according to a black dot ratio and a black dot density of the to-be-recognized English word;

generating 6 feature maps at the second layer with an array of 1×626 by performing a one-dimensional convolution operation of convolutional neural network on the feature map at the first layer;

generating 18 feature maps at the third layer with an array of 1×624 by performing a one-dimensional convolution operation of convolutional neural network on the feature maps at the second layer;

forming a feature map at the fourth layer with an array of 18×624 by performing a fully connected operation processing of convolutional neural network on the feature maps at the third layer;

forming a feature map at the fifth layer with an array of 64×624 by performing a fully connected operation processing of convolutional neural network on the feature map at the fourth layer;

forming a feature map at the sixth layer with an array of 64×624 by outputting the feature map at the fifth layer through a bidirectional long short-term memory (LSTM) network and performing a fully connected operation processing;

forming a feature map at the seventh layer with an array of 37×624 by outputting the feature map at the sixth layer through a bidirectional long short-term memory (LSTM) network and performing a fully connected operation processing;

the processing unit performing a probability recognition according to the feature map at the seventh layer with an array of 37×624 and outputting a probabilistic string with a length of 624 characters; and the processing unit then recognizing the probabilistic string according to a search setting including a blank character setting and a repeated character setting and outputting a word recognition result.

2. The English word image recognition method as claimed in claim 1, wherein the processing unit retrieves the to-be-recognized image and defines a character picture frame for each character in the to-be-recognized image, and the processing unit calculates an average spacing distance of the character picture frame, and then retrieves the to-be-recognized English word from an average spacing distance.

3. The English word image recognition method as claimed in claim 2, wherein the processing unit defines the word picture frame for the to-be-recognized English word, and the processing unit scales the word picture frame into the scaled picture of 100×48 pixels.

4. The English word image recognition method as claimed in claim 3, wherein the processing unit vertically projects the scaled picture and generates the projected columnar distribution map with 100 black dot columns, and the processing unit then calculates a proportion value of each of the black dot columns from the projected columnar distribution map and generates a feature array at the first layer with an array of 1×100.

5. The English word image recognition method as claimed in claim 4, wherein the processing unit defines 33×16 feature picture grids averagely in the scaled picture, and calculates a black dot density of each of the feature picture grids to generate a feature array at the second layer with an array of 1×528, the processing unit combines the feature array at the first layer with the feature array at the second layer to generate the feature map at the first layer.

6. The English word image recognition method as claimed in claim 1, wherein the processing unit uses a core with a random value and an array of 1×3 to perform 6 one-dimensional convolution operations of convolutional neural network to generate the 6 feature maps at the second layer with an array of 1×626.

7. The English word image recognition method as claimed in claim 1, wherein the processing unit uses a core with a random value and an array of 1×3 to perform 18 one-dimensional convolution operations of convolutional neural network to generate the 18 maps at the third layer with an array of 1×624.

8. The English word image recognition method as claimed in claim 1, wherein the processing unit uses a bidirectional long short-term memory (LSTM) network to output the feature map at the fifth layer into a feature map with an array of 128×624, and performs a fully connected operation processing to form the feature map at the sixth layer with an array of 64×624, and the processing unit uses a bidirectional long short-term memory (LSTM) network to output the feature map at the sixth layer into a feature map with an array of 128×624, and performs a fully connected operation processing to form the feature map at the seventh layer with an array of 37×624.

9. The English word image recognition method as claimed in claim 1, wherein the processing unit recognizes the probabilistic string and removes the blank character setting and the repeated character setting to output the word recognition result.

* * * * *